United States Patent [19]

Gambling

[11] 4,164,200
[45] Aug. 14, 1979

[54] FEEDING DEVICE

[75] Inventor: Kenneth H. Gambling, Rosanna, Australia

[73] Assignee: Set 'N' Forget Products Pty. Ltd., Australia

[21] Appl. No.: 836,079

[22] Filed: Sep. 23, 1977

[30] Foreign Application Priority Data

Sep. 24, 1976 [AU] Australia .............................. PC7498
Jul. 6, 1977 [AU] Australia .............................. PP0725

[51] Int. Cl.² ............................................. A01K 5/02
[52] U.S. Cl. .................................................. 119/51.12
[58] Field of Search .............. 119/51.12, 51.13, 51.14, 119/51.15, 51.11

[56] References Cited

U.S. PATENT DOCUMENTS

| | | | |
|---|---|---|---|
| 2,157,682 | 5/1939 | Sweeny | 119/51.12 |
| 3,532,075 | 10/1970 | Cooper | 119/51.12 |
| 3,648,660 | 3/1972 | Esquival | 119/51.5 |
| 3,845,744 | 11/1974 | Carr et al. | 119/51.13 |
| 3,884,189 | 5/1975 | Ruth | 119/51.13 |

*Primary Examiner*—Hugh R. Chamblee
*Attorney, Agent, or Firm*—Lowe, King, Price & Becker

[57] ABSTRACT

A modular, feeder system comprises a master module and at least one slave module adapted to be coupled together in tandem. Each of the modules comprises a food container within a housing, with a lid on the housing being spring biased open but maintained normally closed by a latch. The latch is tripped by a trip collar carried by a shaft extending through the housing. An end of each shaft is adapted to be longitudinally coupled to the shaft of an adjacent module. Only the master module contains a timing device coupled to its shaft and mounted to its housing. The shafts of the master and slave modules are longitudinally coupled to each other to cause the lids to open in succession and in time relationship to each other.

10 Claims, 5 Drawing Figures

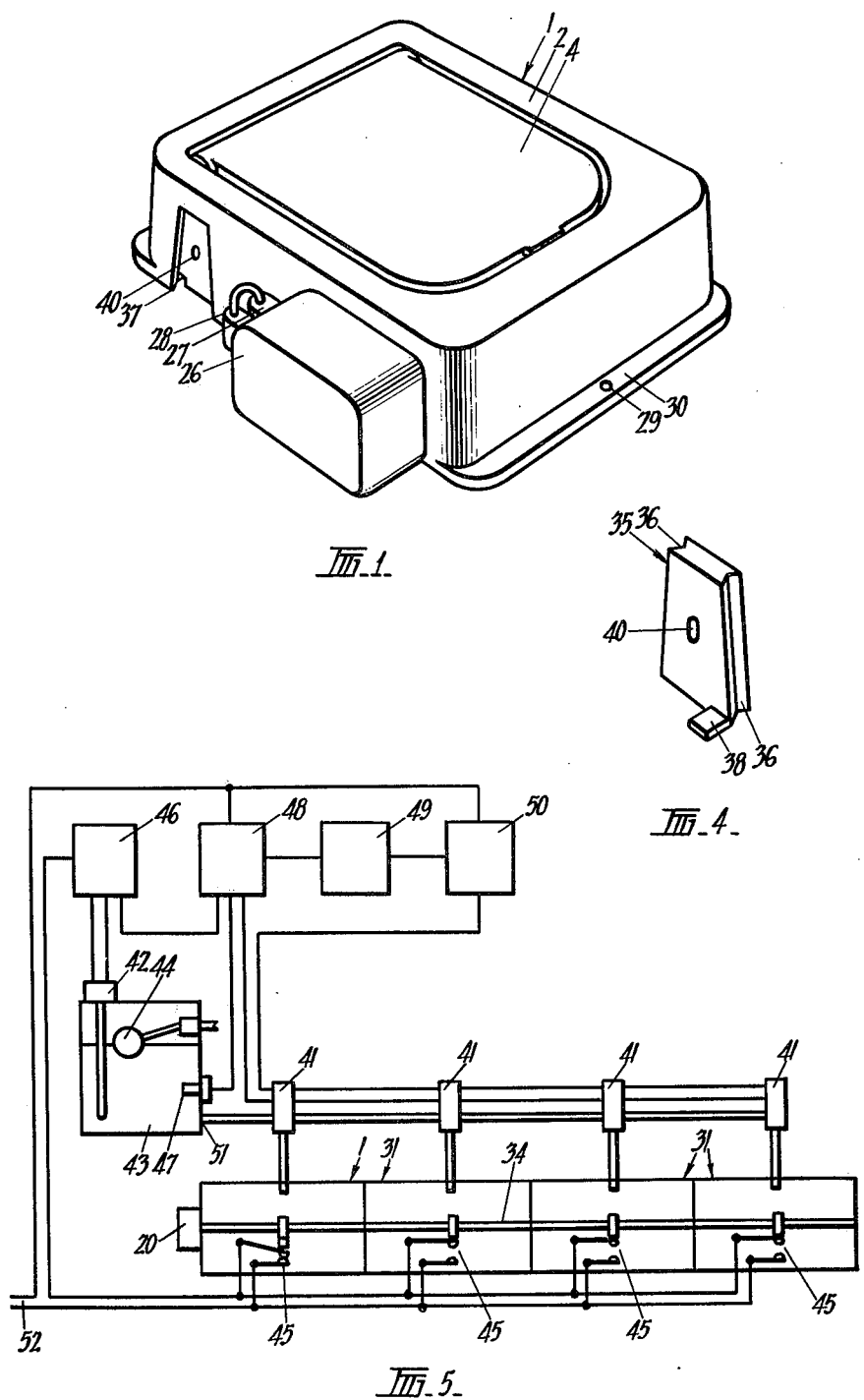

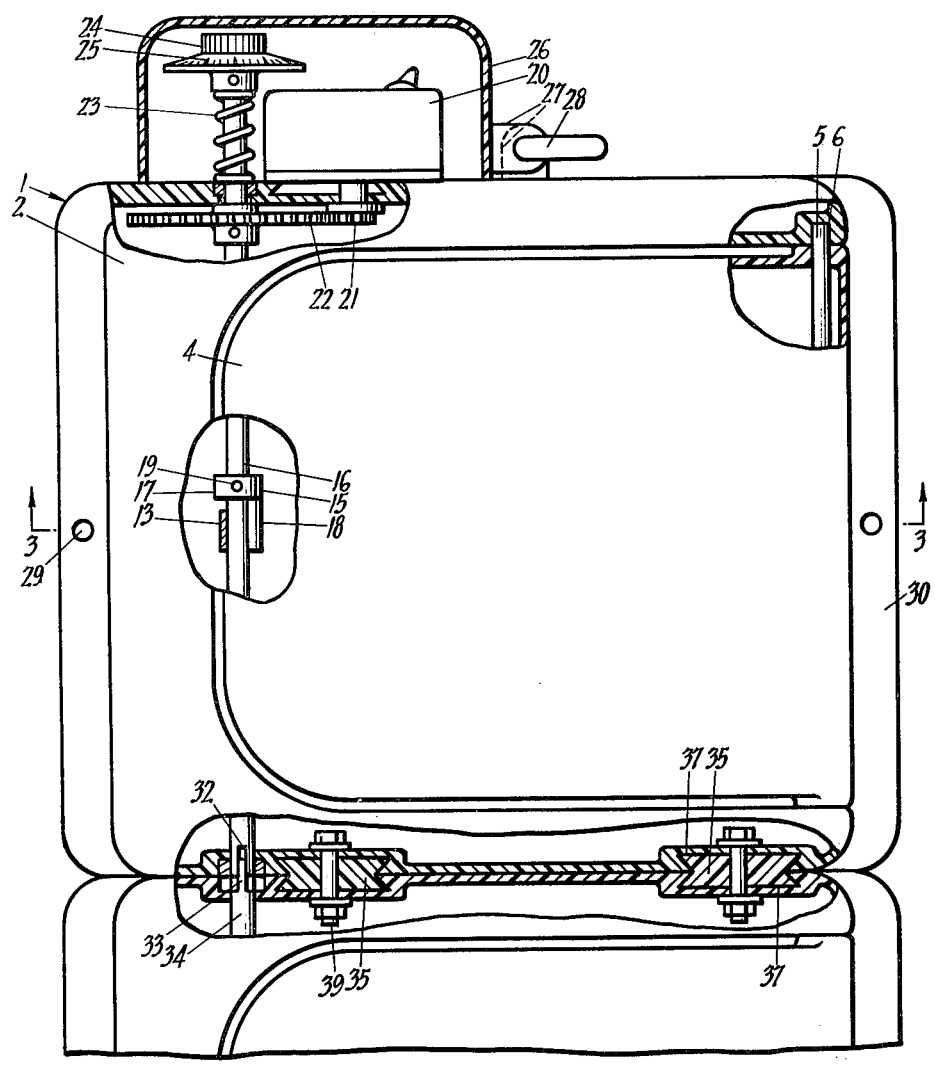
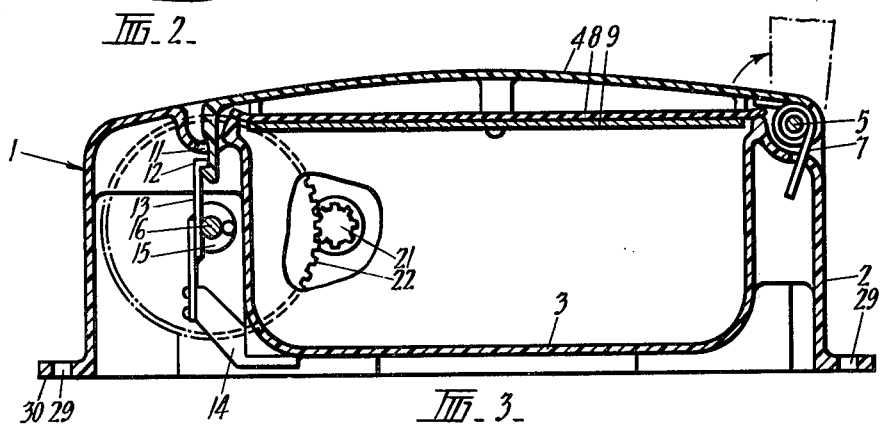

FEEDING DEVICE

The present invention relates to an animal feeder and it refers particularly, but not exclusively, to an animal feeder which allows a dog or cat to be fed without requiring the owner's presence.

It has been a problem for animal owners contemplating a weekend away, or a holiday, of how to feed their pets whilst they are away. Up until the present invention the owners have had to place their pets in boarding kennels or ask a neighbour to look after them. Many neighbours are reluctant to mind animals and many find it a tiresome chore to feed an animal every night and frequently forget to feed the animal. Other people leave out enough food for the animal to cover their absence, but the animal frequently devours the lot in one day, or stray animals eat the animal's rations.

Accordingly it is an object of the present invention to provide a self contained animal feeder which allows cyclic feeding of the animal.

A further object of the invention is to provide an animal feeder which only dispenses a predetermined amount of feed at a predetermined time.

According to the invention there is provided an animal feeder driving module including a food container, a lid hingedly attached to said food container, biasing means associated with said food container which urges said lid toward an open position, latch means on said lid, means cooperating with said latch means to normally maintain said lid in a closed position, a timing device having a shaft extending therefrom, a trip collar located on said shaft and adapted to release said cooperating means to allow said lid to open, said shaft having a connecting means at its free end adapted to cooperate with a shaft of a similar animal feeder slave module, only said master module including said timing device.

The invention further provides a modular, animal feeder system, comprising a master module and at least one slave module, each of said modules including a food container, a lid hingedly attached to said food container, biasing means associated with said food container for urging said lid toward an open position, latch means on said lid, and means cooperating with said latch means for maintaining said lid in a normally closed position; each of said slave modules having a first shaft passing therethrough, opposite ends of said first shaft having coupling means; only said master module including a timing device having a second shaft extending therefrom, the free end of said second shaft also having a coupling means; means for locating said master module and said at least one slave module with said first and second shafts coupled together at said coupling means; and trip collar means located on said first and second shafts and adapted to release said cooperating means to allow said lids to open in succession and in timed relationship to each other.

With the growing popularity of dehydrated pet food the previously available pet feeders have been unable to dispense both dry and dehydrated food. The present invention allow a wide range of food to be offered to an animal and insures that the full dietary requirements of the animal are met.

The invention overcomes this problem by having each module include a valve for allowing hot water to enter each food container, each of said valves being actuated by a switch coupled to a respective first shaft, and said switch controlling, in use, operation of a water heater which produces said hot water.

In order that the invention may be readily understood and put into practical effect there will now be described with reference to the accompanying illustrative drawings a preferred embodiment of an animal feeder according to the present invention. In the drawings:

FIG. 1 is a perspective view of the animal feeder driving module;

FIG. 2 is a top view of the animal feeder driving module of FIG. 1 having an animal feeder slave module attached thereto;

FIG. 3 is a cross-sectional view through the animal feeder driving module of FIG. 2 along line 3—3;

FIG. 4 is a joining piece which couples the animal feeder driving module to the animal feeder slave module; and FIG. 5 is a circuit diagram for allowing hot water to be supplied to the animal feeder driving and slave modules.

Referring to the drawings there is shown an animal feeder driving module 1. The driving module 1 has an outer casing 2 which defines a food container 3 for receiving pets food. A lid 4 covers the feed container 3 to prevent spoilage of the pets food. The lid 4 has a shaft 5 pivotally mounted in journals 6 of outer casing 2. The lid 4 is biassed towards an open position as shown in phantom lines by a spring 7 located on the shaft 5. To ensure a watertight seal between lid 4 and food container 3, the lid includes a rubber seal 8 and support plate 9 fixedly attached to the lid 4. At the free end of lid 4 is a depending barb portion 10 which projects through an opening 11 in outer casing 2.

The barb portion 10 cooperates with a catch 12 of a spring blade 13 attached to the outer casing 2 by bracket 14 to maintain the lid 4 in a closed position. To allow the spring blade 13 to release the lid 4 a trip collar 15 is adjustably mounted on a shaft 16. The trip collar comprises a ring portion 17 and arm 18. The arm 18 will move the spring blade 13 outwardly (towards the left in FIG. 3) to release lid 4. A grub screw 19 provides the adjustability of the collar 15 on shaft 16.

To rotate the shaft 16 a timing device 20 is coupled to a pinion 21 via reduction gear 22 attached to shaft 16. The timing device 16 may be a battery operated clock, a mechanical clock or any other suitable timing device. In a preferred construction of the invention a battery operated clock using rechargeable dry or wet cells is charged by solar panels. The charging of the cells by solar panels avoids the problem of trailing power cords from a mains supply and allows the unit to be self-contained.

The shaft 16 is resiliently biassed by a spring 23 located between the outer casing 2 and a knob 24 to enable the shaft 16 to be set in any position by disengagement of reduction gear 22 with pinion 21. Timing indicia 25 on knob 24 presents the human operator with a visual means of determining and setting the timing of the timing device 16. To prevent authorised tampering of timing device 16 and ingress of moisture and dirt therein, a protective cover 26 is hingedly attached to the outer casing 2, and locked to the casing by tabs 27 using a padlock 28. As animals may move the module 1 from its intended position holes 29 are provided in a peripheral rim 30 to enable stakes (not shown) to be driven therethrough and into the ground.

In use the operator places food in the food container 3 and closes the lid 4. The timing knob 24 is turned and set to open the lid 4 at a predetermined time. The timing device 20 is turned on and shaft 16 rotates. When arm 18 of trip collar 15 contacts the spring blade 13 the barb portion 10 is released and the lid is biassed to an open position by spring 7 to expose the food to the animal.

To enable the animal to be fed more than once only, a similar animal feeder slave module 31 is coupled to the driving module 1. The shaft 16 of driving module 1 has a slot 32 to receive a complementary shaped extension 33 of shaft 34 of slave module 31. The construction of slave module 31 is the same as that of driving module 1 except that the timing device 22 is not required. To avoid unnecessary duplication only a part of slave module 31 is illustrated in FIG. 2. The outer casing 2 of driving module 1 is interlocked with the outer casing of slave module 31 by two joining pieces 35. Each joining piece 35 is trapezoidal in shape and has U-shaped grooves 36 for sliding in the dovetailed grooves 37 in both the driving and slave modules 1, 31 respectively. A locking tab 38 and fastening means 39 through apertures 40 ensure a positive interlock between the driving and slave modules.

It can be seen that further slave modules 31 may be added to provide a substantially extended feeding cycle for an animal. Thus a very much simpler and convenient means is provided whereby an animal may be unattended for several days or even a week.

FIG. 5 illustrates an animal feeder system with three slave modules 31 coupled to driving module 1. To provide hot water for use with dehydrated pet food each module is provided with an electrically operated valve 41 which enters the food container 3 at any convenient location. A water heater 42 heats the water contained in a tank 43. The level of the tank 43 is controlled by a float valve 44 adapted to be connected to a water supply (not shown). On shafts 16 and 34 a switch 45 is actuable to turn on the water heater 42 a predetermined time before lid 4 opens. The switches 45 operate a heater control 46 to supply power to the water heater 42. A temperature sensor 47 coupled to a valve control 48 prevents over heating of the water. A delay timer 49 prevents the hot water being discharged prematurely and a further valve control 50 enables only the correct valve 41 to operate to allow the flow of hot water into the required food container 3. The hot water is released through outlet 51 to the respective valves 41. Electrical power is provided by lines 52 which may or may not be connected to the same electrical supply as that of timing device 20.

In operation when switch 45 is actuated (as shown in driving module 1) the heater control 46 supplies current to water heater 42. The delay timer 49 ensures that the water will reach the required temperature before lid 4 opens. Before the lid opens the hot water is sprayed into the appropriate food container in readiness for the animal. As the lid opens the heater control will be turned off (by a switch not shown). It is obvious that the tank 43 could be replaced by a tank for each module and the arrangement of the valves 41 may be modified to achieve the same result.

It is thought that the invention and many of its attendant advantages will be understood from the foregoing description and it will be apparent that various changes may be made in the form, construction and arrangement of the parts and that changes may be made in the form, construction and arrangement of the apparatus described without departing from the spirit and scope of the invention or sacrificing all of its material advantages, the form hereinbefore described being merely a preferred embodiment thereof.

I claim:

1. An animal feeder driving module including a food container, a housing for said food container, a lid hingedly attached to said food container housing, biasing means associated with said food container housing which urges said lid toward an open position, latch means on said lid, means cooperating with said latch means to normally maintain said lid in a closed position, a timing device mounted to said housing and turning a shaft extending through said housing, a trip collar located on said shaft and adapted to release said cooperating means to allow said lid to open, a free end of said shaft extending outward from said housing and including longitudinal coupling means for coupling said shaft longitudinally with a shaft of a similar animal feeder slave module, only said master module including said timing device.

2. The animal feeder driving module as claimed in claim 1 wherein said lid includes sealing means which cooperate with said food container to prevent, in use, contamination of any food placed therein.

3. The animal feeder driving module as claimed in claim 1 wherein said latch means includes a barb portion, and said means cooperating with said latch means to normally maintain said lid in a closed position includes a spring blade having a catch at its free end for retaining said barb portion.

4. The animal feeder driving module as claimed in claim 1 wherein the trip collar is adjustably mounted on said shaft.

5. The animal feeder driving module as claimed in claim 1 wherein, in use, hot water is sprayed into said food container prior to opening of said lid, said hot water being provided by a water heater actuated by a switch coupled to said shaft.

6. The module of claim 1, wherein said longitudinal coupling means includes a tongue or groove member located on the free end of said shaft and adapted to mate with a complementary tongue or groove member on the slave module shaft.

7. A modular, animal feeder system, comprising a master module and at least one slave module, each of said modules including a food container, a housing for said food container, a lid hingedly attached to said food container housing, biasing means associated with said food container housing for urging said lid toward an open position, latch means on said lid, and means cooperating with said latch means for maintaining said lid in a normally closed position; each of said slave modules having a first shaft passing through its housing, opposite ends of said first shaft having longitudinal coupling means; only said master module including a timing device mounted to its housing and turning a second shaft extending from its housing, the free end of said second shaft also having a longitudinal coupling means; means for locating said master module and said at least one slave module with said first and second shafts coupled together longitudinally at said coupling means; and trip collar means located on said first and second shafts and adapted to release said cooperating means to allow said lids to open in succession and in timed relationship to each other.

8. The modular, animal feeder system as claimed in claim 7 wherein adjacent modules are coupled together with at least one joining piece, said joining piece slidably mounted in a respective recess in each of said adjacent modules.

9. The modular, animal feeder system as claimed in claim 7 wherein each module includes a valve for allowing hot water to enter each food container, each of said valves being actuated by a switch coupled to a respective first shaft, and said switch controlling, in use, operation of a water heater which produces said hot water.

10. The system of claim 7, wherein said longitudinal shaft coupling means includes tongue and groove coupling means on mating ends of said first and second shafts.

* * * * *